United States Patent [19]

Goscenski, Jr.

[11] 4,060,146
[45] Nov. 29, 1977

[54] POWER STEERING MECHANISM

[75] Inventor: Edward J. Goscenski, Jr., Battle Creek, Mich.

[73] Assignee: Eaton Corporation, Cleveland, Ohio

[21] Appl. No.: 631,754

[22] Filed: Nov. 13, 1975

[51] Int. Cl.$^2$ .............................................. F15B 13/16
[52] U.S. Cl. ............................... 180/161; 91/375 A; 418/61 B
[58] Field of Search ............ 91/375 A, 375 R, 391 R; 180/148, 152, 153, 154, 155, 156, 157, 158, 159, 160, 161, 162, 163; 418/61 B

[56] References Cited

U.S. PATENT DOCUMENTS

| Re. 25,291 | 12/1962 | Charlson | 91/375 |
|---|---|---|---|
| 3,145,626 | 8/1964 | Vickers | 91/375 A |
| 3,273,465 | 9/1966 | Eddy | 91/375 A |
| 3,433,127 | 3/1969 | Thompson | 91/375 A |
| 3,446,021 | 5/1969 | Lech | 418/61 B |
| 3,773,081 | 11/1973 | Venable | 91/375 A |
| 3,807,456 | 4/1974 | Colletti | 91/375 A |
| 3,817,151 | 6/1974 | Kawabata | 91/375 A |
| 3,853,435 | 12/1974 | Ogasahara | 418/61 B |
| 3,867,870 | 2/1975 | Shimoura | 91/375 A |

Primary Examiner—Martin P. Schwadron
Assistant Examiner—Abraham Hershkovitz
Attorney, Agent, or Firm—Teagno & Toddy

[57] ABSTRACT

A power steering mechanism especially for highway-type vehicles. The mechanism includes a worm defining an axial bore and an input shaft projecting into the bore and having a lost motion connection with the bore of the worm adjacent the output end of the worm. A valve is disposed at the output end of the worm with a gerotor motor disposed adjacent the valve. Rotation of the input shaft, relative to the worm, rotates the inner valve sleeve, relative to the outer valve sleeve, directing pressurized fluid to the gerotor motor. The gerotor motor includes an externally-toothed star member which orbits and rotates upon actuation of the motor. A dogbone has one end in splined engagement with the gerotor star and the other end in splined engagement with the worm to translate the orbital and rotational movement of the star into rotational movement of the worm. A torsion bar has one end in engagement with the steering wheel end of the input shaft and its other end fixed to the worm.

21 Claims, 12 Drawing Figures

POWER STEERING MECHANISM

BACKGROUND OF THE DISCLOSURE

The present invention relates to a power steering mechanism, and more particularly, to such a mechanism in which the hydraulically-actuated power assist is mechanically connected to the steering worm.

Power steering mechanisms of the type to which the present invention relates may have many different applications, but are most frequently used in larger vehicles such as trucks for which the required turning force is substantially greater than in automotive uses.

In general, power steering mechanisms of this class comprise an input shaft connected to a worm gear, with a sector gear in engagement with the worm and attached to a pitman arm. The sector gear and pitman arm arrangement translate rotation of the worm gear into steering movement of the steering linkage.

Typically, if the mechanism is a power steering mechanism, rotation of the input shaft actuates a valve arrangement which directs pressurized hydraulic fluid to the power assist device. U.S. Pat. No. 3,273,465 illustrates such a mechanism in which the pressurized fluid is ported to one end of a power cylinder, with a piston rod being attached to the steering linkage. Such an arrangement is relatively complex because of the addition of the power cylinder, the connection to the steering linkage and the necessary fluid conduits between the cylinder and the valving. In addition, such a system requires additional space for the cylinder adjacent the steering linkage and therefore, would not be adaptable to many vehicle designs, or would require a redesign of that portion of the vehicle.

U.S. Pat. No. 3,433,127 illustrates another approach in which the pressurized fluid is communicated through a series of longitudinal ports to the opposite end of the worm gear where the pressurized fluid acts on the area of the ball screw piston, making it easier to turn the screw. While this mechanism has the advantage of being a self-contained unit (no external cylinders, conduits, etc.), it retains the disadvantage of complex valving and porting, and in addition, is large and expensive to manufacture.

SUMMARY OF THE INVENTION

Accordingly, it is an object of the present invention to provide a power steering mechanism which is a self-contained unit and has no separate or external power assist devices.

It is another object of the present invention to provide a power steering mechanism having a fluid-actuated power assist device, the output of which provides a direct torsional input to the worm gear.

It is a further object of the present invention to provide such a power steering mechanism which is capable of maintaining approximate proportionality between input shaft rotation, valve displacement, torque on the worm gear and "road feel".

It is yet another object of the present invention to provide a power steering mechanism having a power assist portion capable of a greater output torque, although requiring less space than prior art power assist units.

The above and other objects to the present invention are accomplished by the provision of an improved power steering mechanism for transmitting steering input into movement of an output steering member such as a sector gear and pitman arm. The power steering mechanism comprises a worm gear in engagement with the sector gear and an input shaft which receives the steering input and has a lost motion connection to the worm member to permit a relative rotational displacement between the worm and input shaft. A valve includes a first relatively rotatable valve member and means are provided for transmitting rotation of the input shaft into rotation of the first valve member. The mechanism includes a fluid-actuated motor having a movable element and the valve is operable to direct pressurized fluid from a fluid source to the motor upon relative rotation of the first valve member, thereby causing movement of the movable element. Means are included for translating the movement of the movable element into rotational movement of the worm, such as a shaft member in splined engagement with both the worm and the movable element.

Preferably, the mechanism includes a torsion bar having one end fixed to the input shaft adjacent the steering input and the other end fixed to the worm member to provide "road feel" while the input shaft is being rotated through the relative displacement between the input shaft and the worm gear.

DESCRIPTION OF THE PREFERRED EMBODIMENT

Figure 1:
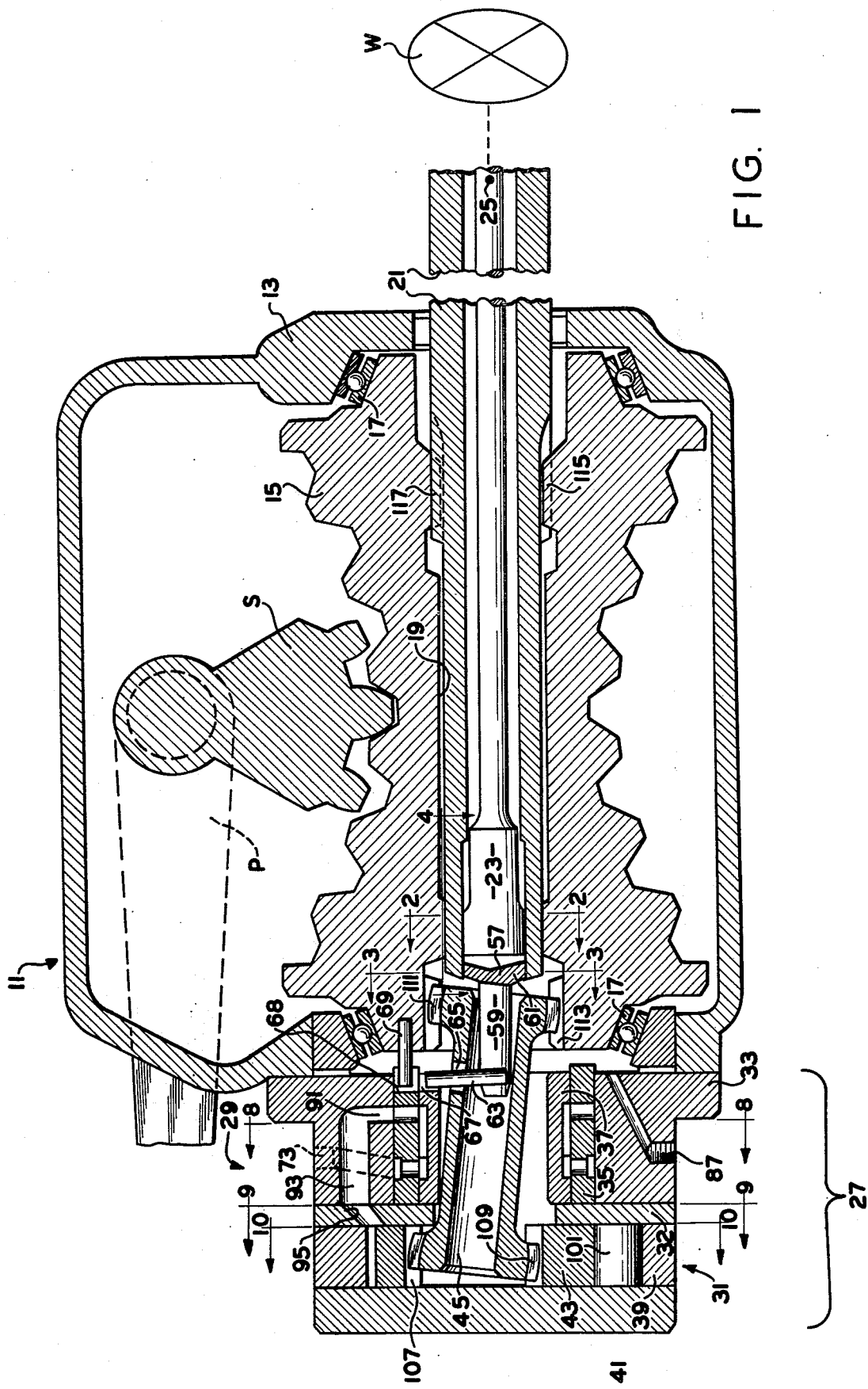
FIG. 1 is a partly diagrammatic, fragmentary cross section of the power steering mechanism of the present invention.

Referring now to the drawings, which are not intended to limit the present invention, FIG. 1 illustrates a power steering mechanism which receives steering input from a steering wheel W (shown diagrammatically) and translates the input into steering movement of a linkage (not shown) by means of a sector gear S and pitman arm P, the operation of which is well known in the art and forms no part of the present invention.

The steering mechanism, generally designated 11, includes a housing 13 and a worm gear 15, rotatably supported within the housing 13 by sets of suitable anti-friction bearings 17. The worm gear 15 defines a central, axial bore 19 into which projects an input shaft 21, capable of transmitting manual steering force to the worm gear 15. For reasons which will be made apparent subsequently, the input shaft 21 enters the axial bore 19 at the input end of the worm (to the right in FIG. 1), and extends almost to the output end of the worm (to the left in FIG. 1).

Disposed longitudinally within the hollow input shaft 21 is a torsion bar 23 having its input end (toward the steering wheel W) fixed to the input shaft 21, as by means of a pin connection 25. The opposite end of the torsion bar 23 engages the worm gear 15 to provide "road feel" during turning as will be described below.

Adjacent the output end of the worm gear 15 is the power assist portion of the mechanism, generally designated 27, which includes a valve section 29 and a motor section 31, with a port plate 32 being disposed between the valve section 29 and motor section 31.

The valve section 29 includes a valve housing 33 having a cylindrical outer valve sleeve 35 rotatably disposed therein and an inner valve sleeve 37 rotatably disposed within the outer sleeve 35.

The motor section 31 preferably comprises a gerotor motor having an internally-toothed stator member 39 and an end cap 41 bolted to the valve housing 33 by means of a plurality of bolts (not shown), and eccentrically disposed within the stator 39 is an externally-toothed rotor 43. A dogbone shaft 45 is utilized to transmit the motion of the rotor 43 into an input torque to the worm gear 15, thus providing a direct power assist to facilitate turning of the worm.

Figure 2:
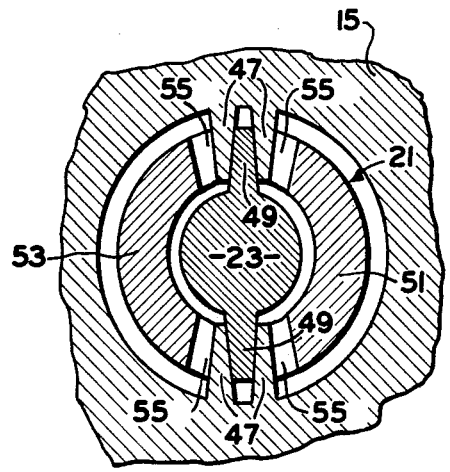
FIG. 2 is an enlarged cross section taken on line 2—2 of FIG. 1.
Figure 4:
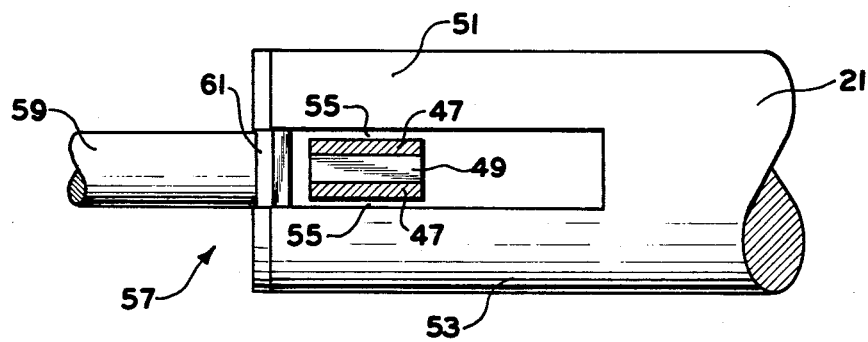
FIG. 4 is an enlarged cross section taken on line 4—4 of FIG. 1.

The power steering mechanism will now be described in greater detail, with reference to FIG. 1 and in conjunction with the subsequent figures. FIG. 2 illustrates the primary connection between the input shaft 21, the torsion bar 23 and the worm gear 15. The axial bore 19 defined by the worm gear 15 includes pairs of internal teeth 47 diametrically opposed within the bore 19. The torsion bar 23 includes a pair of diametrically opposed external teeth 49, each of the external teeth 49 preferably being in tight engagement with one of the pairs of internal teeth 47 to provide a zero backlash connection between the torsion bar 23 and worm gear 15. As may be seen by viewing FIG. 2 in conjunction with FIG. 4, the output end of the input shaft 21 is bifurcated, i.e., comprises a pair of oppositely disposed portions 51 and 53, defining diametrically opposed gaps 55 therebetween. The gaps provide clearance and the input shaft 21 should never come into contact with any of the internal teeth 47 throughout the entire range of lost motion. As used herein, the term "lost motion" is intended to mean and include any type of connection between the input shaft 21 and worm gear 15 which permits an initial rotational displacement of the input shaft before rotation of the worm gear occurs. It should be clearly understood that within the scope of the present invention, many other types of lost motion connections may be used.

Figure 3:
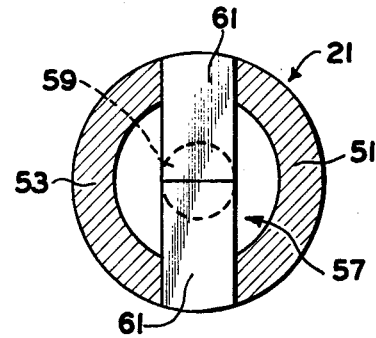
FIG. 3 is an enlarged cross section taken on line 3—3 of FIG. 1.

Referring now to FIGS. 1 and 3, there is illustrated the means by which rotation of the input shaft 21 is transmitted to the inner valve sleeve 37. An extension member, generally designated 57, has an axially-aligned cylindrical portion 59 and a pair of generally flat tabs 61 extending from the cylindrical portion 59, the tabs 61 preferably being press-fit between the arcuate portions 51 and 53 of the input shaft 21 to provide a zero backlash connection between the input shaft 21 and the extension member 57. Oppositely disposed from the tabs 61, the cylindrical portion 59 defines a diametral bore 61 (shown more clearly in FIG. 1). The diametral bore has a pin 63 which is preferably press-fit into the bore to prevent relative movement between the pin 63 and cylindrical portion 59. The pin 63 extends radially outward through an opening 65 in the wall of the dogbone shaft 45, with the outward end of the pin 63 engaging a cut out portion 67 defined by the inner valve sleeve 37 (see FIG. 5). The use of the extension member 57 and pin 63 connecting the inner valve sleeve 37 to the input shaft 21 insures identical rotational displacement of the valve sleeve 37 and input shaft 21.

In a similar manner, the outer valve sleeve 35 defines a cut out portion or notch 68 and a pin 69 provides rigid connection between the valve sleeve 35 and the worm gear 15 to insure identical rotational displacement of the valve sleeve 35 and worm gear 15 for reasons which will be made apparent subsequently.

Figure 5:
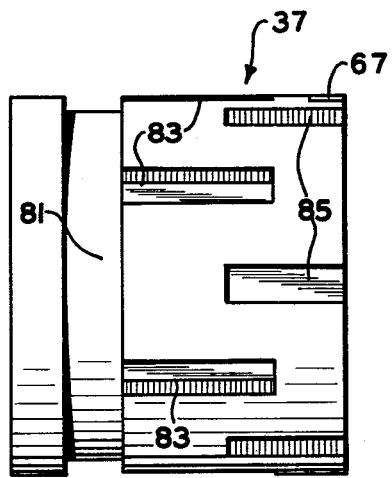
FIG. 5 is an enlarged elevation of the inner valve sleeve of the present invention.
Figure 6:
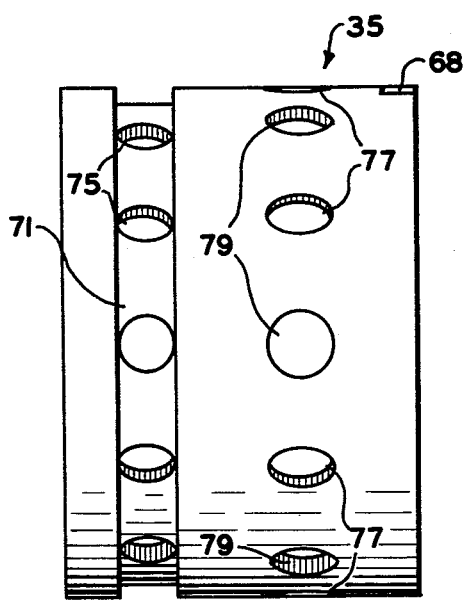
FIG. 6 is an enlarged elevation of the outer valve sleeve of the present invention.

In the enlarged evaluations of FIGS. 5 and 6 there are shown the inner valve sleeve 37 and the outer valve sleeve 35, respectively, in greater detail. The outer valve sleeve 35 includes an annular groove 71, which is in constant fluid communication with an inlet port 73 (see FIG. 1). In communication with the annular groove 71 is a plurality of radially-extending supply ports 75, opening to the interior of valve sleeve 35. Also defined by the valve sleeve 35 is a plurality of meter ports 77 and a plurality of meter ports 79, the ports within each plurality preferably being uniformly spaced circumferentially above the valve sleeve 35. In FIG. 6, the pluralities of meter ports 77 and 79 have been illustrated as axially aligned, but it will be understood by those skilled in the art of sleeve valving that the ports 77 and the ports 79 may be axially spaced apart.

The inner valve sleeve 37 includes a supply groove 81 in fluid communication with the supply ports 75 of the outer sleeve 35. In constant fluid communication with the supply groove 81 is a plurality of uniformly spaced, axially extending meter passages 83 which, as may be seen by viewing FIG. 5 in conjunction with FIG. 6, extend far enough axially to communicate with the meter ports 77 and/or with the meter ports 79 depending upon the relative rotational position of the inner sleeve 37 and outer sleeve 35. The inner sleeve 37 further defines a plurality of uniformly spaced, axially extending return passages 85 which, in a manner similar to that previously described, may communicate either with the meter ports 77 and/or with the meter ports 79. Fluid which enters the return passages 85 is then ported to the interior of the mechanism from which it passes to a return port 87, and from which the fluid is ported to the pump reservoir (not shown).

Figure 8:
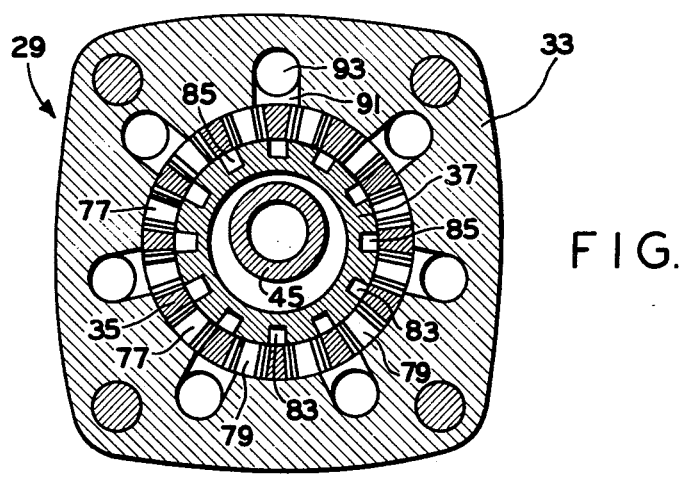
FIGS. 8, 9 and 10 are cross-sections taken, respectively, on lines 8—8, 9—9 and 10—10 of FIG. 1, and on the same scale.
Figure 9:
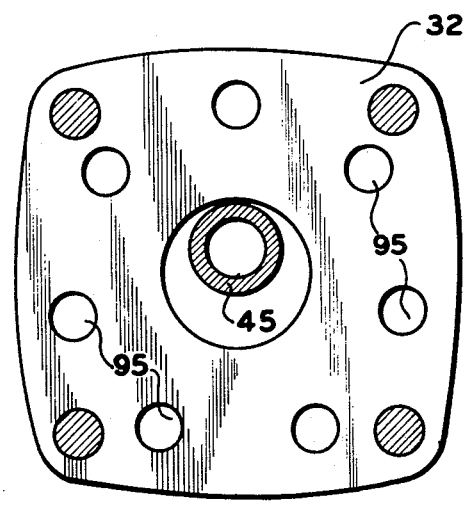

Referring now to FIG. 8, which is a cross section on a plane through the meter ports, the valve section 29 is shown in a "neutral" position, i.e., the inner valve sleeve 37 has not been rotationally displaced relative to the outer valve sleeve 35. The valve housing 33 defines a plurality of radial bores 91 adapted to communicate with certain of the meter ports 77 and 79 in a manner well known in the valving art. Each of the radial bores 91 empties into an axial passage 93 which, in turn, is in communication with a mating port 95 (see FIG. 9) extending axially through port plate 32.

Figure 10:
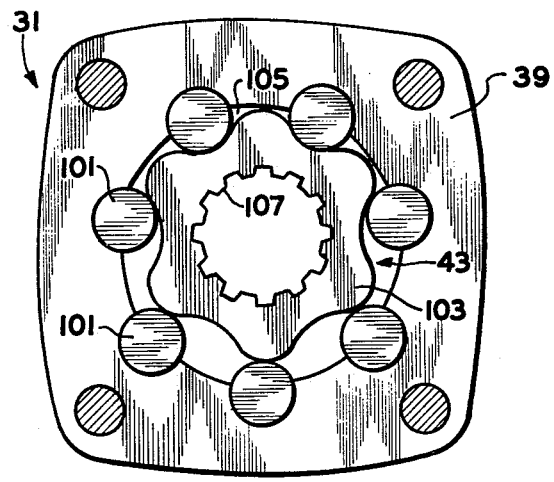

Referring now to FIG. 10, the motor section 31 is illustrated which, in the subject embodiment, is a gerotor motor of the type well known in the art including the stator 39 and rotor 43 previously referred to in connection with FIG. 1. The stator 39 includes a plurality of internal teeth which, preferably, comprise cylindrical rollers 101 disposed rotatably within semi-cylindrical recesses formed in the body of the stator 39. The rotor 43 includes a plurality of external teeth 103 (one less than the number of internal teeth) and the interengagement of the external teeth 103 and the rollers 101 defines a plurality of expanding and contracting volume chambers 105, as is well known in the art. Each of the volume chambers 105 is in alignment with one of the ports 95 to provide a continuous flow path comprising radial bores 91, axial passages 93, ports 95, and volume chambers 105.

The rotor 43 includes a plurality of internal splines 107 in engagement with a set of external splines 109 on the dogbone 45. The opposite end of the dogbone 45 includes another set of external splines 111 in engagement with a set of internal splines 113 formed within the worm gear 15. Thus, orbital and rotational movement of the rotor 43 within the stator 39 is transmitted by dogbone 45 into rotational, high torque input to the worm gear 15.

Adjacent the input end of the worm gear 15 the axial bore 19 defines a set of internal splines 115 which is in mesh with external splines 117 formed about the outer periphery of the input shaft 21. These meshing internal splines 115 and external splines 117 provides a fail-safe connection between the input shaft 21 and the worm gear 15, such that failure of the power assist portion of the power steering mechanism or failure of the connection between the input and the worm gear such as the torsion bar 23, or any other such failure, will not interfere with the capability of turning the worm gear 15 manually. It should be noted that this type of fail-safe arrangement between input shaft and worm gear is made possible by the arrangement of the present invention whereby the primary connection between the input shaft and worm gear is toward the "output" end of the worm gear. Furthermore, this arrangement facilitates the use of a gerotor motor as the power assist device. It should also be noted that because the engagement of internal splines 115 and external splines 117 is intended only as a fail-safe connection, the splines 115 and 117 are meshed loosely enough that under normal operating conditions, the splines 115 and 117 are never touching or in engagement, i.e., the angular spacing between the splines 115 and 117 is greater than the normal lost motion (under power) between the input shaft 21 and the worm gear 15.

Operation

In describing the operation of the power steering mechanism of the present invention, it will be assumed that the mechanism is initially in the "neutral" position as is illustrated in FIGS. 1, 2, 4, 7A and 8. As the steering wheel W is turned, the input shaft 21 turns, and for purposes of this description, it will be assumed that the input shaft 21 turns clockwise in FIG. 2.

During this turning of input shaft 21 relative to the worm gear 15, the end of the torsion bar 23 connected to the input shaft 21 rotates with the input shaft, while the opposite end of the torsion bar 23 and the external teeth 49 remain stationary. The resulting twisting of the torsion bar 23 provides the "road feel" generally considered desirable in such steering systems.

At the same time, the turning of the input shaft 21 causes the inner valve sleeve 37 to rotate relative to the outer valve sleeve 35 by means of the pin 63 as previously described. The degree of rotation will depend on the amount of power assist required. With the valve section 29 in its neutral condition, as may best be seen in FIGS. 7A and 8, each of the meter ports 77 and meter ports 79 is in slight fluid communication with one of the meter passages 83 and one of the return passages 85, such that pressurized fluid entering the valving from inlet port 73 flows through the meter passages 83. From each of the meter passages 83 the pressurized fluid flows through one meter port 77 and one meter port 79, from where the fluid flows through the respective return passages 85, and eventually to the return port 87.

Figure 7A:
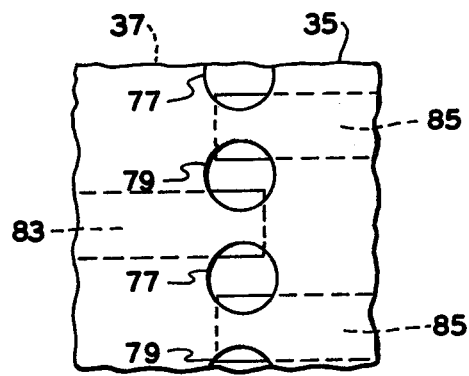
FIGS. 7A, 7B and 7C are diagrammatic illustrations of the operation of the valving of the invention.
Figure 7B:
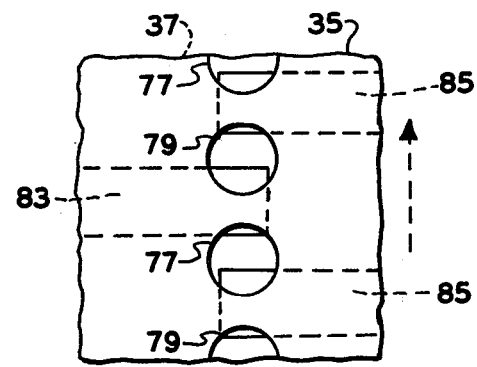

As the inner valve sleeve 37 is turned clockwise (in FIG. 8), each of the meter passages 83 reduces the area of communication with its respective meter port 77 while the area of communication between the meter passage 83 and the respective meter port 79, is increased (see FIG. 7B). Similarly, each of the return passages 85 reduces the area of communication with its respective meter port 79, while the area of communication between the passage 85 and the respective meter port 77 is increased. This results in obtaining an increase in pressure in meter ports 79 which are supplied by the power steering pump through passage 83. Meter ports 77 are vented to the reservoir of the power steering pump through passage 85. The pressure in meter ports 77 can be increased by further clockwise rotation of the input shaft along with valve sleeve 37 with respect to the outer sleeve 35 (along with the worm gear), which further restricts the metering area between ports 77 and passages 83, such as is well understood in open-center rotary valve metering. It should be understood that this invention will operate equally well with closed-center valving.

This pressurized fluid is ported to the motor 31 through any of the radial bores 91 which happen to be in communication with meter ports 79 at that moment. In like manner, opposite volume chambers 105 are vented to return through any of the radial bores 91 which happen to be in communication with meter ports 77 at that moment. This causes a clockwise rotation of rotor 43, (as viewed from the input), which in turn provides an assisting torque to the worm 15, through the dogbone shaft 45. This torque is proportional to the rotation of valve sleeve 37 with respect to valve sleeve 35, which in turn is proportional to the twist of torsion bar 23. As just described, the input torque is proportional to the power assist torque, thus providing road feel. It should be noted that the torsion bar 23 is pinned to the input shaft 21 at point 25 and the other end is pinned to the worm gear 15 at point 47 with zero lash. This provides improved road feel as the steering wheel is always in solid contact with the worm gear and any lash that may be experienced at the splines or the dogbone 45 should have no effect on the feel experienced by the driver.

Figure 7C:
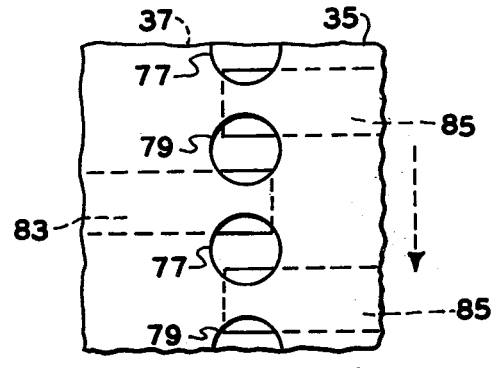

Referring now to FIG. 7C, valving action is illustrated for the opposite direction of turning, corresponding to counterclockwise rotation of valve sleeve 37 in FIG. 8. Because the general principles of sleeve valving of this type as well as the sequencing and interaction with a gerotor motor are well known in the art, further detailed description is believed to be unnecessary to an understanding of the present invention.

It should also be noted that the configuration of the power steering mechanism of the present invention permits easy conversion from a power steering unit to a manual unit or vice-versa. In FIG. 1 it will be seen that the power unit disclosed herein may be converted to a manual steering unit by simply removing entire power assist portion 27, including the pin 69 and dogbone 45, and replacing these with a cover member configured substantially the same as the enlarged flanged portion of the valve housing 33. It should be apparent that the conversion process may easily be reversed to convert a manual unit to the power unit shown in FIG. 1.

It will be seen that the present invention provides a power steering mechanism in which the input shaft actuates the valve to supply pressurized fluid to a fluid motor, and the movable element of the fluid motor provides a high torque power assist directly to the worm gear to facilitate steering.

This invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I claim:
1. A power steering mechanism for providing movement of an output steering member in response to rotation of a steering wheel, comprising:
   a. a worm gear in toothed engagement with the output steering member, said worm gear being mounted in a housing and having an input end toward the steering wheel and an output end;
   b. an input shaft receiving steering input and having a lost motion connection to said worm gear permitting a relative rotational displacement therebetween;
   c. valve means including a first valve member rotatable relative to the housing and means for transmitting rotation of said input shaft into rotation of said first valve member;
   d. a fluid-actuated motor disposed adjacent the output end of said worm gear including a movable element, said movable element having a motion one component of which is rotational;
   e. said valve means being disposed between said output each of said worm gear and said fluid-actuated motor and being operable to direct pressurized fluid from a fluid source to said fluid-actuated motor upon said relative rotation of said first valve member, said pressurized fluid causing movement of said movable element; and
   f. means for translating said movement of said movable element into rotational movement of said worm gear.

2. A power steering mechanism as claimed in claim 1 wherein said valve means includes a second rotatable valve member operatively associated with said first valve member, said relative rotation of said first valve member being also relative to said second valve member.

3. A power steering mechanism as claimed in claim 2 wherein said second valve member is operable to rotate as said worm gear rotates to maintain a relative rotational displacement between said first and second valve members of substantially the same number of degrees as said relative rotational displacement between said worm gear and said input shaft.

4. A power steering mechanism as claimed in claim 1 including a torsion bar having one portion in fixed engagement with said input shaft adjacent said steering input and having another portion in fixed engagement with said worm gear.

5. A power steering mechanism as claimed in claim 4 wherein said lost motion connection comprises said input shaft having a bifurcated end portion and said worm gear having internal teeth disposed between the bifurcations.

6. A power steering mechanism as claimed in claim 5 wherein said another portion of said torsion bar includes external teeth in engagement with said internal teeth of said worm gear.

7. A power steering mechanism as claimed in claim 1 wherein said fluid-actuated motor comprises an internally-toothed member and an externally-toothed member eccentrically disposed within said internally-toothed member for relative movement therebetween, the teeth of said members interengaging to define a plurality of expanding and contracting volume chambers during said relative movement.

8. A power steering mechanism as claimed in claim 7 wherein said movable element comprises one of said internally-toothed member and said externally-toothed member.

9. A power steering mechanism as claimed in claim 7 wherein said movable element comprises said externally-toothed member defining a set of internal splines and said movement translating means comprises a shaft member having a set of external splines in engagement with said internal splines.

10. A power steering mechanism as claimed in claim 1 wherein said movement translating means comprises a shaft member, and said first valve member defines a central bore with said shaft member projecting through said central bore.

11. A power steering mechanism as claimed in claim 10 wherein said shaft member is hollow and defines an opening in the wall thereof and said rotation transmitting means includes an extension member having one end in fixed engagement with said input shaft and the other end projecting within said hollow shaft member and a connecting member in fixed engagement with said other end of said extension member and with said first valve member.

12. A power steering mechanism for transmitting steering input to a steering wheel into movement of an output steering member, said mechanism comprising:
   a. a worm gear in toothed engagement with the output steering member, said worm gear being mounted in a housing and defining an input end toward the steering wheel and an output end, said worm gear defining an axial bore including internal connecting means adjacent said output end;
   b. an input shaft receiving steering input and extending into said axial bore from said input end and having an output end in operative association with said internal connecting means;
   c. valve means disposed adjacent said output end of said worm gear, said valve means including a first valve member rotatable relative to the housing and means for transmitting rotation of said input shaft into rotation of said first valve member;
   d. a fluid-actuated motor including a movable element, said valve means being disposed between said fluid-actuated motor and said output end of said worm gear;
   e. said valve means being operable in response to rotation of said input shaft to direct pressurized fluid from a fluid source to said fluid-actuated motor to cause movement of said movable element; and
   f. means for translating said movement of said movable element into rotational movement of said worm gear.

13. A power steering mechanism as claimed in claim 12 wherein said axial bore of said worm gear includes second internal connecting means adjacent said input end and said input shaft includes a portion thereof operatively associated with said second connecting means to provide a fail-safe connection between said worm gear and said input shaft.

14. A power steering mechanism as claimed in claim 12 wherein said operative association between said output end of said input shaft and said internal connecting means comprises a lost motion connection.

15. A power steering mechanism as claimed in claim 12 wherein said valve means includes inner and outer relatively rotatable valve sleeves and means for transmitting rotation of said input shaft into rotation of one of said valve sleeves.

16. A power steering mechanism as claimed in claim 15 wherein the other of said valve sleeves is connected for rotation with said worm gear.

17. A power steering mechanism as claimed in claim 12 including an elongated torsion member having one end in fixed engagement with said input shaft toward the steering wheel end thereof, and having the opposite end in fixed engagement with said internal connecting means of said worm gear.

18. A power steering mechanism as claimed in claim 15 wherein said fluid-actuated motor comprises an internally-toothed member and externally-toothed member eccentrically disposed within said internally-toothed member for relative movement therebetween, the teeth of said members interengaging to define a plurality of expanding and contracting volume chambers during said relative movement.

19. A power steering mechanism as claimed in claim 18 wherein said relative movement is both orbital and rotational, said inner valve sleeve is hollow, said movable element comprises said externally-toothed member, and said movement translating means comprises a shaft member having one end in engagement with said externally-toothed member, and the other end in engagement with said worm gear, said shaft member extending through said hollow inner valve sleeve.

20. A power steering mechanism as claimed in claim 12 wherein said output steering member comprises a sector gear in toothed engagement with said worm gear, said rotational movement of said worm gear causing said sector gear to pivot about its axis.

21. A power steering mechanism for providing movement of an output steering member in response to rotation of a steering wheel, comprising:
 a. a worm gear mounted for rotation about its axis and in toothed engagement with the output steering member to transmit said rotation thereto, said worm gear being mounted in a housing and having an input end toward the steering wheel and an output end;
 b. an input shaft receiving steering input and having a lost motion connection to said worm gear permitting a relative rotational displacement therebetween;
 c. valve means including a first valve member rotatable relative to the housing and means for transmitting rotation of said input shaft into rotation of said first valve member;
 d. a fluid-actuated motor disposed adjacent the ouput end of said worm gear including a movable element;
 e. said valve means being disposed between said output end of said worm gear and said fluid actuated motor and being operable to direct pressurized fluid from a fluid source to said fluid-actuated motor upon said relative rotation of said first valve member, said pressurized fluid causing movement of said movable element, said movement including a rotational component;
 f. shaft means for translating said movement of said movable element into rotational movement of said worm gear; and
 g. said worm gear, said input shaft, said valve means, said fluid-actuated motor, and said shaft means being arranged relative to each other to permit conversion of said power steering mechanism to a manual steering mechanism by removal of said valve means, said fluid-actuated motor, and said shaft means without disassembling said worm gear and said input shaft.

* * * * *